US010325546B2

(12) United States Patent
Zhang et al.

(10) Patent No.: US 10,325,546 B2
(45) Date of Patent: Jun. 18, 2019

(54) ARRAY SUBSTRATE, DISPLAY PANEL, DRIVING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Chunbing Zhang, Beijing (CN); Yichiang Lai, Beijing (CN); Liang Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 473 days.

(21) Appl. No.: 14/908,808

(22) PCT Filed: Sep. 1, 2015

(86) PCT No.: PCT/CN2015/088758
§ 371 (c)(1),
(2) Date: Jan. 29, 2016

(87) PCT Pub. No.: WO2016/141695
PCT Pub. Date: Sep. 15, 2016

(65) Prior Publication Data
US 2017/0039928 A1 Feb. 9, 2017

(30) Foreign Application Priority Data

Mar. 6, 2015 (CN) .......................... 2015 1 0101402

(51) Int. Cl.
*G09G 3/36* (2006.01)
*G09G 3/20* (2006.01)
(Continued)

(52) U.S. Cl.
CPC ....... *G09G 3/2077* (2013.01); *G02F 1/13624* (2013.01); *G02F 1/136286* (2013.01);
(Continued)

(58) Field of Classification Search
CPC ... G09G 3/34; G09G 3/36; F21V 7/04; G06K 9/00; H01L 23/12; H03K 17/96;
(Continued)

(56) References Cited

U.S. PATENT DOCUMENTS

2006/0139281 A1* 6/2006 Park ..................... G09G 3/3614
345/96
2009/0027325 A1* 1/2009 Kim .................. G02F 1/136286
345/92

(Continued)

FOREIGN PATENT DOCUMENTS

CN 1731503 A 2/2006
CN 102809856 A 12/2012
(Continued)

OTHER PUBLICATIONS

International Search Report and Written Opinion both dated Dec. 11, 2015; PCT/CN2015/088758.
(Continued)

*Primary Examiner* — Pegeman Karimi
(74) *Attorney, Agent, or Firm* — Ladas & Parry LLP; Loren K. Thompson

(57) ABSTRACT

An array substrate, a display panel, a driving method thereof and a display device are provided. Each pixel in the array substrate includes four sub-pixels having different color filter colors and arranged in two rows and two columns. With respect to an example in which each row of sub-pixels corresponds to one gate line and each column of sub-pixels correspond to two data lines, during 3D display, two gate lines corresponding to each row of pixels apply gate scan-
(Continued)

ning signals to this row of pixels, and two data lines corresponding to each column of sub-pixels apply gray scale signals to two sub-pixels belonging to each pixel in this column of sub-pixels respectively. Two sub-pixels having color filters of different colors belonging to a single pixel, in each column of sub-pixels, may receive gray scale signals over different data lines.

7 Claims, 5 Drawing Sheets

(51) Int. Cl.
G09G 3/00 (2006.01)
G09G 3/3225 (2016.01)
G09G 3/3266 (2016.01)
G09G 3/3275 (2016.01)
G02F 1/1362 (2006.01)
G02F 1/1343 (2006.01)

(52) U.S. Cl.
CPC .......... *G09G 3/003* (2013.01); *G09G 3/2003* (2013.01); *G09G 3/3225* (2013.01); *G09G 3/3266* (2013.01); *G09G 3/3275* (2013.01); *G09G 3/3607* (2013.01); *G09G 3/3677* (2013.01); *G09G 3/3688* (2013.01); *G02F 2001/134345* (2013.01); *G02F 2201/52* (2013.01); *G09G 2300/0452* (2013.01); *G09G 2320/0209* (2013.01)

(58) Field of Classification Search
CPC .......... H05K 1/02; G06F 21/32; G06F 3/045; G06F 3/041; G01R 27/26
See application file for complete search history.

(56) References Cited

U.S. PATENT DOCUMENTS

| | | | |
|---|---|---|---|
| 2010/0225747 A1* | 9/2010 | Chen | G09G 3/003 348/51 |
| 2010/0253668 A1* | 10/2010 | Sugihara | G09G 3/3607 345/211 |
| 2011/0141386 A1 | 6/2011 | Kira et al. | |
| 2015/0261002 A1 | 9/2015 | Fang et al. | |
| 2016/0155777 A1* | 6/2016 | Kabe | H01L 27/32 257/89 |
| 2017/0222149 A1* | 8/2017 | Nakadaira | H01L 51/0023 |

FOREIGN PATENT DOCUMENTS

| | | |
|---|---|---|
| CN | 103091882 A | 5/2013 |
| CN | 103163697 A | 6/2013 |
| CN | 103901688 A | 7/2014 |
| CN | 104656295 A | 5/2015 |
| JP | 06-197626 A | 7/1994 |

OTHER PUBLICATIONS

First Chinese Office Action dated Mar. 7, 2017; Appln. No. 201510101402.5.

* cited by examiner

ARRAY SUBSTRATE, DISPLAY PANEL, DRIVING METHOD THEREOF AND DISPLAY DEVICE

TECHNICAL FIELD

Embodiments of the present disclosure relate to an array substrate, a display panel, a driving method thereof and a display device.

BACKGROUND

At present, 2D (Two-Dimensional) and 3D (Three-Dimensional) switchable display devices have received much attention. 3D display CAN allow images to become more stereoscopic and realistic. Its fundamental principle is to have left and right eyes to receive different images respectively, and the human brain superimpose and reconstruct the received image information to construct images with stereoscopic feeling.

When a 2D/3D switchable display device performs its 3D display function, the general driving manner is scanning gate lines line by line, and the corresponding driving timing diagram is shown in FIG. 1a. In order to reduce crosstalk, a driving manner in which every two adjacent gate lines are both applied with gate scanning signals is generally used, and the corresponding driving timing diagram is shown in FIG. 1b. As can be seen from FIGS. 1a and 1b, within the display time period (e.g., 16.7 ms) of one frame (V-sync), the scanning time for gate lines shown in FIG. 1b is one half of the scanning time for gate lines shown in FIG. 1a, and the blank time t2 between consecutive frames shown in FIG. 1b is significantly greater than the blank time t1 between consecutive frames shown in FIG. 1a. Therefore, applying the driving manner in which every two adjacent gate lines are both applied with gate scanning signals can drastically reduce crosstalk.

At present, a display device such as a liquid crystal display (LCD) and an organic electroluminesecent display (OLED) employs a pixel structure in which a pixel consists of four sub-pixels with color filters of different colors. For example, a red (R) sub-pixel, a green (G) sub-pixel, a blue (B) sub-pixel and a white (W) sub-pixel constitute a pixel. A display device with this kind of pixel structure has an advantage of high light transmission rate.

In a 2D/3D switchable display device having the RGBW square pixel structure, as shown in FIG. 2, the four sub-pixels RGBW in each pixel are aligned in two rows and two columns (as shown in FIG. 2 by the solid line box). In each row of pixels, two sub-pixels electrically connected with the same data line are two sub-pixels with color filters of different colors in the same pixel. For example, in the first row of pixels, the two sub-pixels R and B electrically connected with the data line D1 are two sub-pixels having color filters of different colors in the same pixel. When the 2D/3D switchable display device performs the 3D function, if the driving mode in which every two adjacent gate lines are applied with gate scanning signals at the same time, it is possible that two different sub-pixels having color filters of different colors electrically connected with the same data line and belong to the same pixel receive different gray scale signals, which makes the two sub-pixels having color filters of different colors can only display different gray scales, and it's impossible to independently control the two sub-pixels having color filters of different colors in the same pixel. Therefore, the 2D/3D switchable display device with RGBW square pixel structure can not use the driving manner in which every two adjacent gate lines are applied with gate scanning signals at the same time during 3D display.

SUMMARY

At least one embodiment of the present disclosure provides an array substrate, a display panel, a driving method thereof and a display device to address the problem that a 2D/3D switchable display device having RGBW square pixel structure can not use the driving manner in which every two adjacent gate lines are applied with gate scanning signals at the same time during 3D display.

At least one embodiment of the present disclosure provides an array substrate, comprising: a base substrate, a plurality of gate lines and a plurality of data lines that are located on the base substrate, intersect with and are insulated from each other, and a plurality of pixels arranged in a matrix defined by the gate lines and data lines that intersect with each other; each of the pixels comprises four sub-pixels having different color filter colors and arranged in adjacent two rows and two columns respectively. Each row of sub-pixels corresponds to one gate line, and each column of sub-pixels correspond to two data lines; during 3D display, in a display time of one frame, two gate lines corresponding to each row of pixels are configured to apply gate scanning signals to this row of pixels, and two data lines corresponding to each column of sub-pixels are configured to apply gray scale signals to two sub-pixels belonging to each pixel in this column of sub-pixels respectively; or each column of sub-pixels correspond to one gate line, and each row of sub-pixels correspond to two data lines; during 3D display, in a display time of one frame, two gate lines corresponding to each column of pixels are configured to apply gate scanning signals to this column of pixels, and two data lines corresponding to each row of sub-pixels are configured to apply gray scale signals to two sub-pixels belonging to each pixel in this row of sub-pixels respectively.

In the array substrate of at least one embodiment of the present disclosure, each pixel has a same arrangement for its four sub-pixels having color filters of different colors; in a case where each row of sub-pixels corresponds to one gate line and each column of sub-pixels correspond to two data lines, one of the two data lines corresponding to each column of sub-pixels is configured to apply gray scale signals to each sub-pixel in odd numbered rows in the column of sub-pixels, the other data line is configured to apply gray scale signals to each sub-pixel in even numbered rows in the column of sub-pixels; while each column of sub-pixels correspond to one gate line and each row of sub-pixels correspond to two data lines, one of the two data lines corresponding to each row of sub-pixels is configured to apply gray scale signals to each sub-pixel in odd numbered columns in the row of sub-pixels, the other data line is configured to apply gray scale signals to each sub-pixel in even numbered columns in the row of sub-pixels.

In the array substrate of at least one embodiment of the present disclosure, in a case where each row of sub-pixels corresponds to one gate line and each column of sub-pixels correspond to two data lines, during 2D display, in a display time of one frame, a gate line corresponding to each row of sub-pixels is configured to apply gate scanning signals to this row of sub-pixels, one of the two data lines corresponding to each column of sub-pixels is configured to apply gray scale signals to sub-pixels corresponding to the data line in the column of sub-pixels, and the other data line is configured to apply gray scale signals to sub-pixels corresponding to the other data line in the column of sub-pixels; in a case where each column of sub-pixels correspond to one gate line and each row of sub-pixels correspond to two data lines, during 2D display, in the display time of one frame, a gate line corresponding to each column of sub-pixels is configured to apply gate scanning signals to this column of sub-pixels, one of the two data lines corresponding to each row of sub-pixels is configured to apply gray scale signals to sub-pixels corresponding to the data line in the row of sub-pixels, and the other data line is configured to apply gray scale signals to sub-pixels corresponding to the other data line in the row of sub-pixels.

In the array substrate of at least one embodiment of the present disclosure, each of the pixels comprises a red sub-pixel, a green sub-pixel, a blue sub-pixel and a white sub-pixel; or each of the pixels comprises a red sub-pixel, a green sub-pixel, a blue sub-pixel and a yellow sub-pixel.

At least one embodiment of the present disclosure further provides a 2D/3D switchable display panel including: the above-mentioned array substrate provided in embodiments of the present disclosure.

At least one embodiment of the present disclosure further provides a 2D/3D switchable display device including: the above-mentioned 2D/3D switchable display panel provided in embodiments of the present disclosure.

At least one embodiment of the present disclosure further provides a driving method for a 2D/3D switchable display panel including: in a case where each row of sub-pixels corresponds to one gate line and each column of sub-pixels correspond to two data lines, during 3D display, in a display time of one frame, two adjacent gate lines corresponding to each row of pixels apply gate scanning signals to this row of pixels, and two data lines corresponding to each column of sub-pixels apply gray scale signals to two sub-pixels belonging to each pixel in this column of sub-pixels respectively; or in a case where each column of sub-pixels correspond to one gate line and each row of sub-pixels correspond to two data lines, during 3D display, in a display time of one frame, two adjacent gate lines corresponding to each column of pixels apply gate scanning signals to this column of pixels, and two data lines corresponding to each row of sub-pixels apply gray scale signals to two sub-pixels belonging to each pixel in this row of sub-pixels respectively.

In the driving method of at least one embodiment of the present disclosure, each pixel has a same arrangement for its four sub-pixels having color filters of different colors; in a case where each row of sub-pixels corresponds to one gate line and each column of sub-pixels correspond to two data lines, one of the two data lines corresponding to each column of sub-pixels applies gray scale signals to each sub-pixel in odd numbered rows in the column of sub-pixels, the other data line applies gray scale signals to each sub-pixel in even numbered rows in the column of sub-pixels; or in a case where each column of sub-pixels correspond to one gate line and each row of sub-pixels correspond to two data lines, one of the two data lines corresponding to each row of sub-pixels applies gray scale signals to each sub-pixel in odd numbered columns in the row of sub-pixels, the other data line applies gray scale signals to each sub-pixel in even numbered columns in the row of sub-pixels.

In the driving method of at least one embodiment of the present disclosure, in a case where each row of sub-pixels corresponds to one gate line and each column of sub-pixels correspond to two data lines, during 2D display, in a display time of one frame, a gate line corresponding to each row of sub-pixels applies gate scanning signals to this row of sub-pixels, one of the two data lines corresponding to each column of sub-pixels applies gray scale signals to sub-pixels corresponding to the data line in the column of sub-pixels, and the other data line applies gray scale signals to sub-pixels corresponding to the data line in the column of sub-pixels. In a case where each column of sub-pixels correspond to one gate line and each row of sub-pixels correspond to two data lines, during 2D display, in the display time of one frame, a gate line corresponding to each column of sub-pixels applies gate scanning signals to this column of sub-pixels, one of the two data lines corresponding to each row of sub-pixels applies gray scale signals to sub-pixels corresponding to the data line in the row of sub-pixels, and the other data line applies gray scale signals to sub-pixels corresponding to the other data line in the row of sub-pixels.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. All other embodiments obtained by one skilled in the art without any creative labor based on the described embodiments of the present disclosure fall within the scope of the present disclosure.

The inventors found out that how to enable a 2D/3D switchable display device with RGBW square pixel structure in 3D display to use the driving manner in which every two adjacent gate lines are applied with gate scanning signals at the same time is a technical problem to be addressed urgently in the state of art.

Figure 1A:
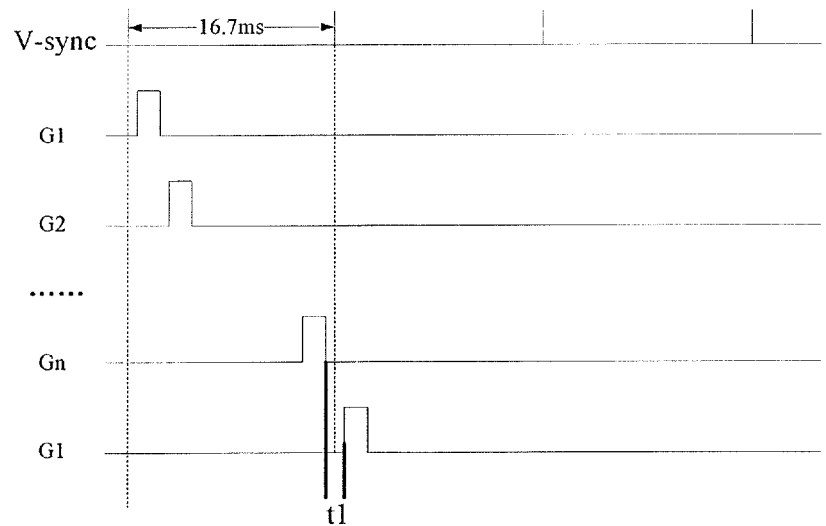
FIGS. 1a and 1b are driving timing diagrams for a 2D/3D switchable display device respectively.
Figure 1B:
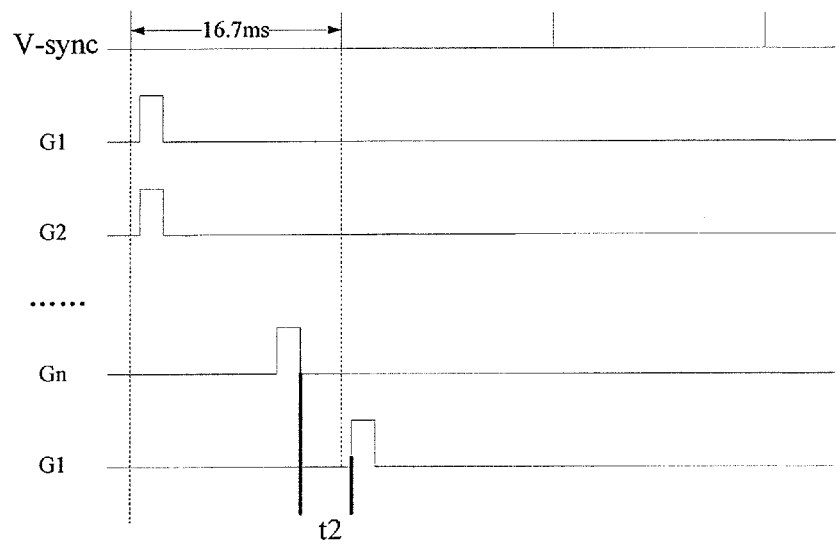
Figure 2:
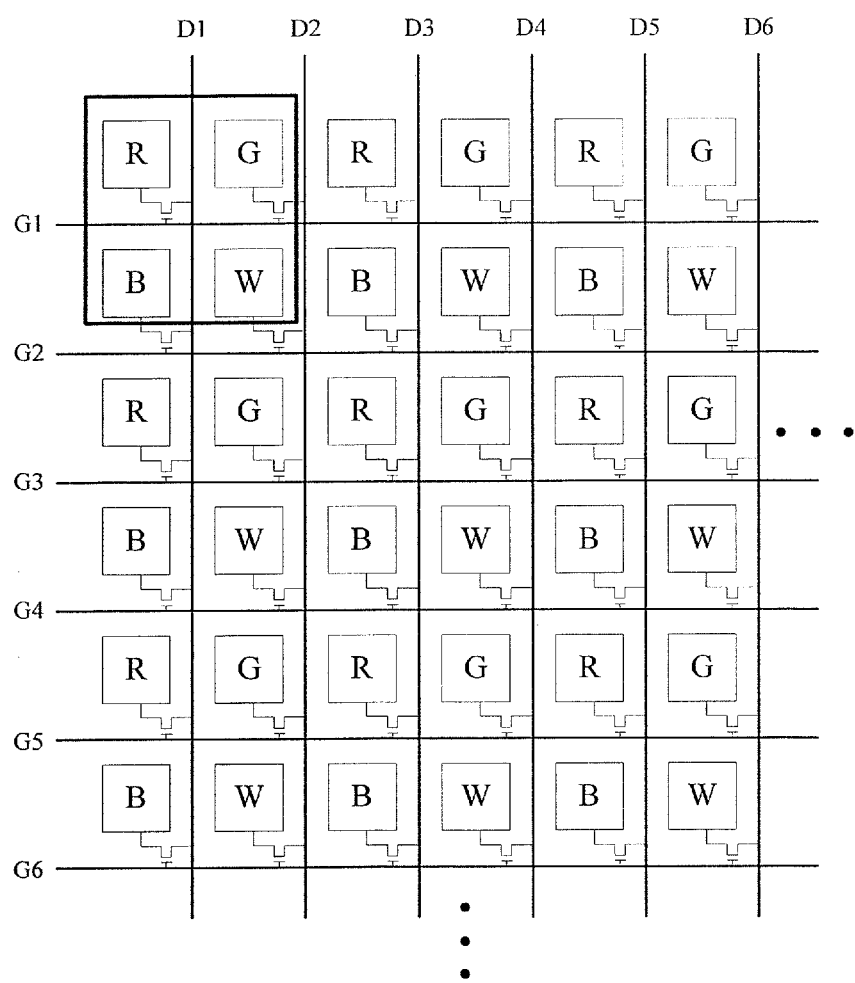
FIG. 2 is a schematic diagram of a pixel structure of a 2D/3D switchable display device with RGBW square pixel structure.
Figure 3:
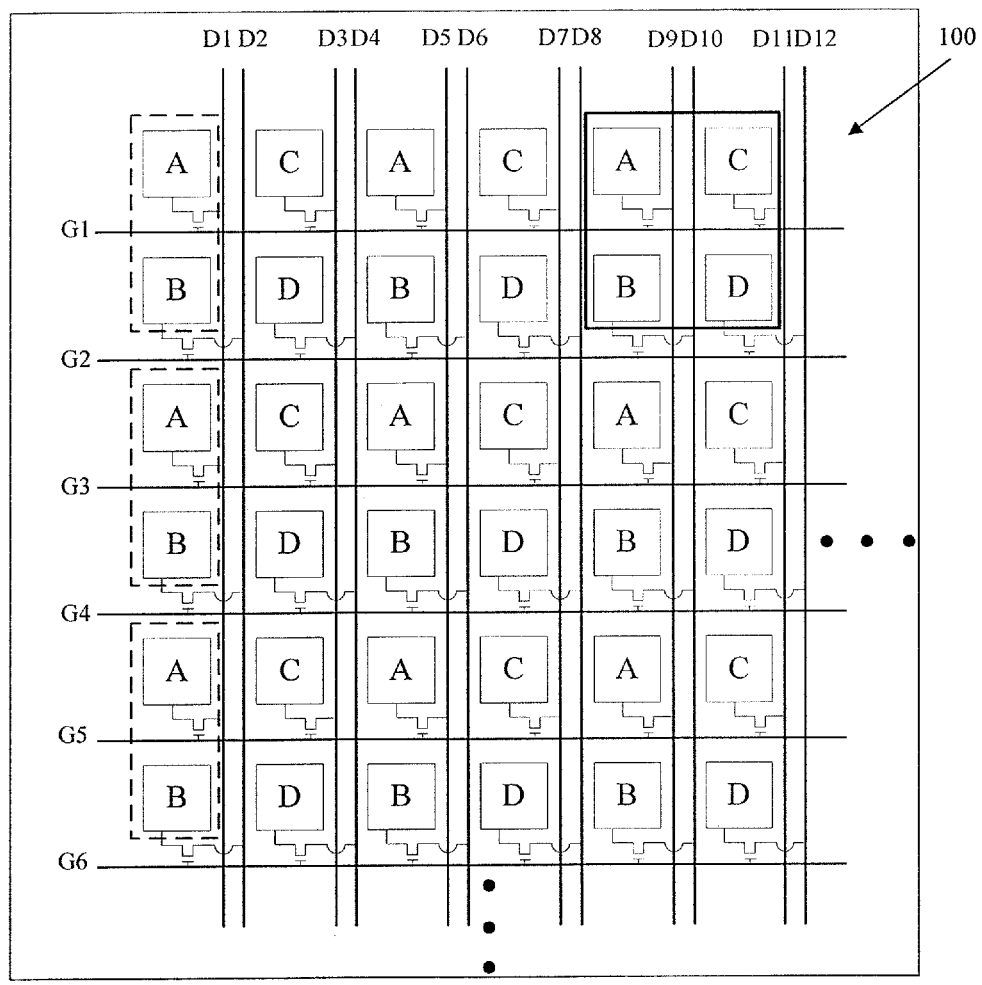
FIGS. 3 and 4 are structure diagrams of an array substrate provided in an embodiment of the present disclosure respectively.
Figure 4:
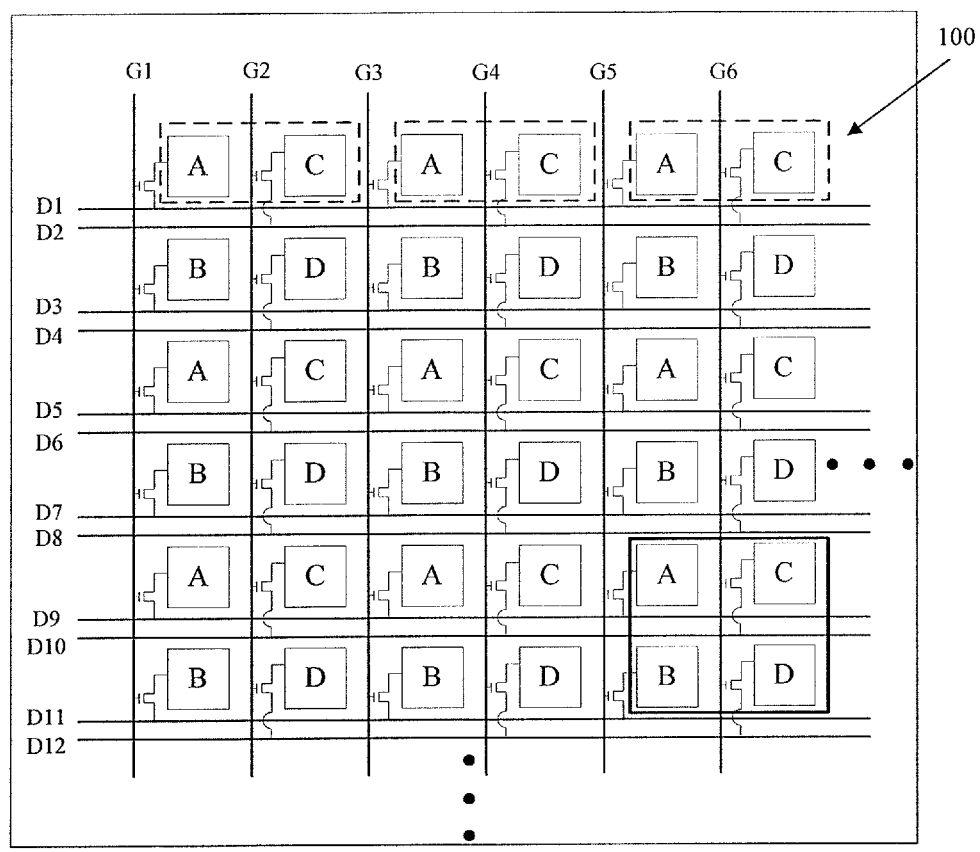

An embodiment of the present disclosure provides an array substrate as shown in FIGS. 3 and 4, including: a base substrate 100, a plurality of gate lines (G1, G2, . . . ) and a plurality of data lines (D1, D2, . . . ) located on the base substrate 100, intersecting with and insulated from each other, and a plurality of pixels arranged in an matrix defined by the gate lines and data lines that intersect with each other. Each pixel includes four sub-pixels having color filters of different colors arranged in adjacent two rows and two columns (as shown in FIGS. 3 and 4 by the solid box). Four sub-pixels in each pixel in FIGS. 3 and 4 are denoted with A, B, C and D respectively. A, B, C and D may denote any one of red (R) sub-pixel, green (G) sub-pixel, blue (B)

sub-pixel and white (W) sub-pixel. Alternatively, A, B, C and D may also denote any one of red (R) sub-pixel, green (G) sub-pixel, blue (B) sub-pixel and yellow (Y) sub-pixel, which is not limited herein.

Each row of sub-pixels corresponds to one gate line, and each column of sub-pixels corresponds to two data lines. For example, as shown in FIG. 3, the first row of sub-pixels correspond to gate line G1, and the first column of sub-pixels corresponds to data lines D1 and D2. During 3D display, in the display time of one frame, two gate lines corresponding to each row of pixels are configured to apply gate scanning signals to this row of pixels, and two data lines corresponding to each column of sub-pixels are configured to apply gray scale signals to two sub-pixels belonging to each pixel in this column of sub-pixels respectively. For example, as shown in FIG. 3, two gate lines G1 and G2 corresponding to the first row of pixels (namely the first row of sub-pixels and the second row of sub-pixels) are configured to apply gate scanning signals to the first row of pixels, and two data lines D1 and D2 corresponding to the first column of sub-pixels are configured to apply gray scale signals to two sub-pixels belonging to each pixel in the first column of sub-pixels respectively (as shown in FIG. 3 by the dashed frame).

In another example, each column of sub-pixels corresponds to a gate line, and each row of sub-pixels corresponds to two data lines. For example, as shown in FIG. 4, the first column of sub-pixels correspond to gate line G1, and the first row of sub-pixels correspond to data lines D1 and D2. During 3D display, in the display time of one frame, two gate lines corresponding to each column of pixels are configured to apply gate scanning signals to this column of pixels, and two data lines corresponding to each row of sub-pixels are configured to apply gray scale signals to two sub-pixels belonging to each pixel in this row of sub-pixels respectively. For example, as shown in FIG. 4, two gate lines G1 and G2 corresponding to the first column of pixels (namely the first column of sub-pixels and the second column of sub-pixels) are configured to apply gate scanning signals to the first column of pixels, and two data lines D1 and D2 corresponding to the first row of sub-pixels are configured to apply gray scale signals to two sub-pixels belonging to each pixel in the first row of sub-pixels respectively (as shown in FIG. 4 by the two sub-pixels in the dashed frame).

With the above-mentioned array substrate provided in at least one embodiment of the present disclosure, with respect to an example in which each row of sub-pixels corresponds to one gate line and each column of sub-pixels correspond to two data lines, during 3D display, in the display time of one frame, two gate lines corresponding to each row of pixels are configured to apply gate scanning signals to this row of pixels, and two data lines corresponding to each column of sub-pixels are configured to apply gray scale signals to two sub-pixels belonging to each pixel in this column of sub-pixels respectively. In this way, two sub-pixels having color filters of different colors belonging to a single pixel, in each column of sub-pixels may receive gray scale signals over different data lines. These two sub-pixels can not only display the same gray scale, but also display different gray scales. Therefore it is possible to control gray scales of two sub-pixels having color filters of different colors belonging to a single pixel, in each column of sub-pixels independently. Therefore, the 2D/3D switchable display device having the above-mentioned pixel structure may use the driving manner in which every two adjacent gate lines are applied with gate scanning signals at the same time during 3D display, thereby achieving the purpose of reducing crosstalk.

For example, as shown in FIG. 3 and FIG. 4, each pixel have the same arrangement for the four sub-pixels having color filters of different colors.

While each row of sub-pixels corresponds to one gate line and each column of sub-pixels correspond to two data lines, one of the two data lines corresponding to each column of sub-pixels is configured to apply gray scale signals to each sub-pixel in odd numbered rows in the column of sub-pixels, the other data line is configured to apply gray scale signals to each sub-pixel in even numbered rows in the column of sub-pixels. For example, as shown in FIG. 3, data line D1 corresponding to the first column of sub-pixels is configured to apply gray scale signals to sub-pixels A in odd numbered rows in the first column of sub-pixels, and data line D2 corresponding to the first column of sub-pixels is configured to apply gray scale signals to sub-pixels B in even numbered rows in the first column of sub-pixels. That is, one of the two data lines corresponding to each column of sub-pixels is configured to apply gray scale signals to sub-pixels having one color filter color in the column of sub-pixels, and the other data line is configured to apply gray scale signals to sub-pixels having the other color filter color in the column of sub-pixels. Such an arrangement is favorable for controlling gray scales of sub-pixels having different color filter colors in the array substrate.

While each column of sub-pixels correspond to one gate line and each row of sub-pixels correspond to two data lines, one of the two data lines corresponding to each row of sub-pixels is configured to apply gray scale signals to each sub-pixel in odd numbered columns in the row of sub-pixels, the other data line is configured to apply gray scale signals to each sub-pixel in even numbered columns in the row of sub-pixels. For example, as shown in FIG. 4, data line D1 corresponding to the first row of sub-pixels is configured to apply gray scale signals to sub-pixels A in odd numbered columns in the first row of sub-pixels, and data line D2 corresponding to the first row of sub-pixels is configured to apply gray scale signals to sub-pixels C in even numbered columns in the first row of sub-pixels. That is, one of the two data lines corresponding to each row of sub-pixels is configured to apply gray scale signals to sub-pixels having one color filter color in the row of sub-pixels, and the other data line is configured to apply gray scale signals to sub-pixels having the other color filter color in the row of sub-pixels. Such an arrangement is favorable for controlling gray scales of sub-pixels having different color filter colors in the array substrate.

For example, as shown in FIG. 3 and FIG. 4, when each row of sub-pixels corresponds to one gate line and each column of sub-pixels correspond to two data lines, during 2D display, in the display time of one frame, a gate lines corresponding to each row of sub-pixels are configured to apply gate scanning signals to this row of pixels, and a data line corresponding to each column of sub-pixels are configured to apply gray scale signals to sub-pixels corresponding to the data line in the column of sub-pixels, and the other data line is configured to apply gray scale signals to sub-pixels corresponding to the other data line in the column of sub-pixels. For example, as shown in FIG. 3, the gate lines G1 corresponding to the first row of pixels is configured to apply gate scanning signals to the first row of sub-pixels, the data lines D1 corresponding to the first column of sub-pixels is configured to apply gray scale signals to sub-pixels A corresponding to D1 in the first column of sub-pixels, and the data line D2 corresponding to the first column of sub-pixels is configured to apply gray scale signals to sub-pixels B corresponding to D2 in the first column of sub-pixels.

When each column of sub-pixels correspond to one gate line and each row of sub-pixels correspond to two data lines, during 2D display, in the display time of one frame, the gate line corresponding to each column of sub-pixels is configured to apply gate scanning signals to this column of sub-pixels, one of the two data lines corresponding to each row of sub-pixels is configured to apply gray scale signals to sub-pixels corresponding to the data line in the row of sub-pixels, and the other data line is configured to apply gray scale signals to sub-pixels corresponding to the other data line in the row of sub-pixels. For example, as shown in FIG. 4, the gate line G1 corresponding to the first column of pixels is configured to apply gate scanning signals to the first column of sub-pixels, the data line D1 corresponding to the first row of sub-pixels is configured to apply gray scale signals to sub-pixels A corresponding to D1 in the first row of sub-pixels, and the data line D2 corresponding to the first row of sub-pixels is configured to apply gray scale signals to sub-pixels C corresponding to D2 in the first row of sub-pixels.

For example, each pixel may include a red (R) sub-pixel, a green (G) sub-pixel, a blue (B) sub-pixel and a white (W) sub-pixel. Alternatively, each sub-pixel may include a red (R) sub-pixel, a green (G) sub-pixel, a blue (B) sub-pixel and a yellow (Y) sub-pixel. Alternatively, in addition to a red (R) sub-pixel, a green (G) sub-pixel, and a blue (B) sub-pixel, each sub-pixel may further include a cyan (C) sub-pixel or a magenta (M) sub-pixel etc. The present disclosure is not limited thereto.

It is to be noted that, the above-mentioned array substrate provided in embodiments of the present disclosure may be applied to a liquid crystal display panel (LCD) or an organic electroluminesecent display (OLED), which is not limited in the present disclosure.

At least one embodiment of the present disclosure further provides a 2D/3D switchable display panel including the above-mentioned array substrate provided in embodiments of the present disclosure. The embodiment of the above-mentioned array substrate may be referred to for implementations of the 2D/3D switchable display panel and redundant description will not be conducted any more here.

At least one embodiment of the present disclosure further provides a 2D/3D switchable display device including the above-mentioned 2D/3D switchable display panel provided in any embodiment of the present disclosure. The 2D/3D switchable display device may be for example any product or component with display function such as a cellphone, a tablet, a TV set, a display, a notebook computer, a digital picture frame, a navigator or the like. Embodiments of the above-mentioned 2D/3D switchable display panel may be referred to for the implementations of the 2D/3D switchable display device and redundant description will not be conducted any more here.

An embodiment of the present disclosure further provides a driving method for a 2D/3D switchable display panel. In the array substrate of the 2D/3D switchable display panel, when each row of sub-pixels corresponding to a gate line, and each column of sub-pixels corresponding to two data lines, the method may include the following steps. During 3D display, in the display time of one frame, two gate lines corresponding to each row of pixels are configured to apply gate scanning signals to this row of pixels, and two data lines corresponding to each column of sub-pixels are configured to apply gray scale signals to two sub-pixels belonging to each pixel in this column of sub-pixels respectively.

In the array substrate of the 2D/3D switchable display panel, when each column of sub-pixels corresponds to one gate line and each row of sub-pixels corresponds to two data lines, the method may include the following steps. During 3D display, in the display time of one frame, two gate lines corresponding to each column of pixels apply gate scanning signals to this column of pixels, and two data lines corresponding to each row of sub-pixels apply gray scale signals to two sub-pixels belonging to each pixel in this row of sub-pixels respectively.

With the above-mentioned driving method provided in at least one embodiment of the present disclosure, it is possible to have two sub-pixels having color filters of different colors belonging to a single pixel, in each column or row of sub-pixels, to receive gray scale signals over different data lines, have these two sub-pixels can not only display the same gray scale, but also display different gray scales, thereby realizing independent control over gray scales of two sub-pixels having color filters of different colors belonging to a single pixel in each column or row of sub-pixels. In this way, the 2D/3D switchable display device having the above-mentioned pixel structure may use the driving manner in which every two adjacent gate lines are applied with gate scanning signals at the same time during 3D display, thereby achieving the purpose of reducing crosstalk.

For example, each pixel has the same arrangement for the four sub-pixels having color filters of different colors. For example, two data lines corresponding to each column of sub-pixels apply gray scale signals to two sub-pixels belonging to each pixel in this column of sub-pixels respectively. In a specific example, one of the two data lines corresponding to each column of sub-pixels applies gray scale signals to sub-pixels in odd numbered rows in the column of sub-pixels, and the other data line applies gray scale signals to sub-pixels in even numbered rows in the column of sub-pixels. That is, one of the two data lines corresponding to each column of sub-pixels applies gray scale signals to sub-pixels having one color filter color in the column of sub-pixels, and the other data line applies gray scale signals to sub-pixels having the other color filter color in the column of sub-pixels. This is favorable for controlling gray scales of sub-pixels having different color filter colors.

Two data lines corresponding to each row of sub-pixels apply gray scale signals to two sub-pixels belonging to each pixel in this row of sub-pixels respectively. In a specific example, one of the two data lines corresponding to each row of sub-pixels applies gray scale signals to sub-pixels in odd numbered columns in the row of sub-pixels, and the other data line applies gray scale signals to sub-pixels in even numbered columns in the row of sub-pixels. That is, one of the two data lines corresponding to each row of sub-pixels applies gray scale signals to sub-pixels having one color filter color in the row of sub-pixels, and the other data line applies gray scale signals to sub-pixels having the other color filter color in the row of sub-pixels. This is favorable for controlling gray scales of sub-pixels having different color filter colors.

For example, when each row of sub-pixels corresponds to one gate line and each column of sub-pixels correspond to two data lines, furthermore, during 2D display, in the display time of one frame, the gate line corresponding to each row of sub-pixels applies gate scanning signals to this row of sub-pixels, one of the two data lines corresponding to each column of sub-pixels applies gray scale signals to sub-pixels corresponding to the data line in the column of sub-pixels, and the other data line applies gray scale signals to sub-pixels corresponding to the data line in the column of sub-pixels. For example, when each column of sub-pixels correspond to one gate line and each row of sub-pixels correspond to two data lines, furthermore, during 2D display, in the display time of one frame, the gate line corresponding to each column of sub-pixels applies gate scanning signals to this column of sub-pixels, one of the two data lines corresponding to each row of sub-pixels applies gray scale signals to sub-pixels corresponding to the data line in the row of sub-pixels, and the other data line applies gray scale signals to sub-pixels corresponding to the other data line in the row of sub-pixels.

Figure 5:
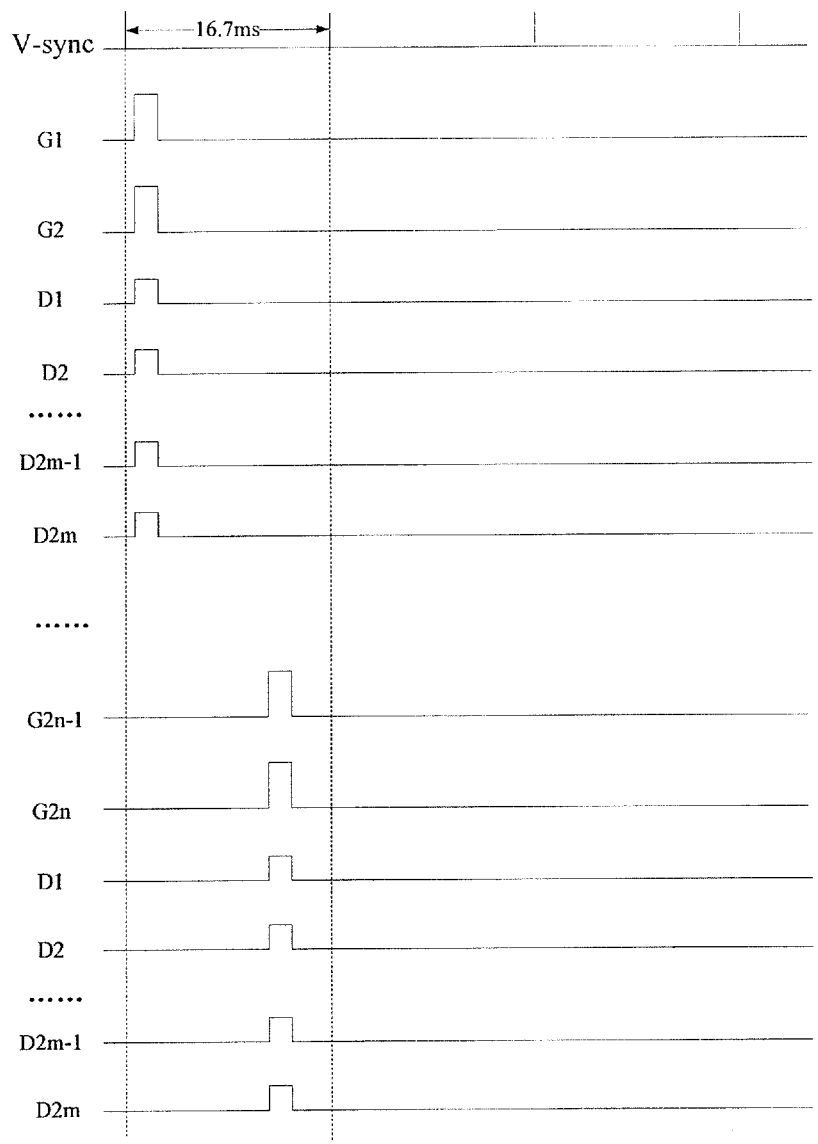
FIG. 5 is a corresponding driving timing diagram of a driving method for a 2D/3D switchable display panel in 3D display provided in an embodiment of the present disclosure.

For example, during 3D display, the corresponding driving timing diagram is shown in FIG. 5. In the display time of one frame (V-sync), which is for example 16.7 ms in the driving timing diagram shown in FIG. 5, every two adjacent gate lines G1 and G2, G3 and G4, . . . G2$n$−1 and G2$n$ are applied with gate scanning signals in sequence, and data lines D1, D2 . . . D2$m$−1, D2$m$ are applied with gray scale signals; during 2D display, corresponding driving timing diagram is similar to conventional technology and will not be described any more here.

Implementations of the driving method for the above-mentioned 2D/3D switchable display panel provided in embodiments of the present disclosure are similar to embodiments of the above-mentioned 2D/3D switchable display panel provided in embodiments of the present disclosure, and repetitions will not be described any more here.

At least one embodiment of the present disclosure provides an array substrate, a display panel and a driving method thereof and a display device. Each pixel in the array substrate includes four sub-pixels having different color filter colors and arranged in two rows and two columns. With respect to an example in which each row of sub-pixels corresponds to one gate line and each column of sub-pixels correspond to two data lines, during 3D display, in the display time of one frame, two gate lines corresponding to each row of pixels apply gate scanning signals to this row of pixels, and two data lines corresponding to each column of sub-pixels are configured to apply gray scale signals to two sub-pixels belonging to each pixel in this column of sub-pixels respectively. In this way, two sub-pixels having color filters of different colors belonging to a single pixel, in each column of sub-pixels may receive gray scale signals over different data lines. These two sub-pixels can not only display the same gray scale, but also display different gray scales. Therefore it is possible to independently control gray scales of two sub-pixels having color filters of different colors belonging to a single pixel, in each column of sub-pixels. Therefore, the 2D/3D switchable display device having the above-mentioned pixel structure may use the driving manner in which every two adjacent gate lines are applied with gate scanning signals at the same time during 3D display, thereby achieving the purpose of reducing crosstalk.

What are described above is related to the illustrative embodiments of the disclosure only and not limitative to the scope of the disclosure; the scopes of the disclosure are defined by the accompanying claims.

The present application claims priority of China Patent application No. 201510101402.5 filed on Mar. 6, 2015, the content of which is incorporated in its entirety as part of the present application by reference herein.

The invention claimed is:
1. An array substrate, comprising:
a base substrate, a plurality of gate lines and a plurality of data lines that are located on the base substrate, intersect with and are insulated from each other, and a plurality of pixels arranged in a matrix defined by the gate lines and data lines that intersect with each other; wherein,
each of the pixels comprises four sub-pixels having different color filter colors and arranged in adjacent two rows and two columns respectively;
each row of sub-pixels corresponds to one gate line, and each column of sub-pixels correspond to two data lines; during 3D display, in a display time of one frame, two gate lines corresponding to each row of pixels are configured to apply gate scanning signals to this row of pixels, and two data lines corresponding to each column of sub-pixels are configured to apply gray scale signals to two sub-pixels belonging to each pixel in this column of sub-pixels respectively; or
each column of sub-pixels correspond to one gate line, and each row of sub-pixels correspond to two data lines; during 3D display, in a display time of one frame, two gate lines corresponding to each column of pixels are configured to apply gate scanning signals to this column of pixels, and two data lines corresponding to each row of sub-pixels are configured to apply gray scale signals to two sub-pixels belonging to each pixel in this row of sub-pixels respectively;
wherein each pixel has a same arrangement for its four sub-pixels having color filters of different colors;
in a case where each row of sub-pixels corresponds to one gate line and each column of sub-pixels correspond to two data lines, one of the two data lines corresponding to each column of sub-pixels is configured to apply gray scale signals to each sub-pixel in odd numbered rows in the column of sub-pixels, the other data line is configured to apply gray scale signals to each sub-pixel in even numbered rows in the column of sub-pixels;
while each column of sub-pixels correspond to one gate line and each row of sub-pixels correspond to two data lines, one of the two data lines corresponding to each row of sub-pixels is configured to apply gray scale signals to each sub-pixel in odd numbered columns in the row of sub-pixels, the other data line is configured to apply gray scale signals to each sub-pixel in even numbered columns in the row of sub-pixels.
2. The array substrate of claim 1, wherein
in a case where each row of sub-pixels corresponds to one gate line and each column of sub-pixels correspond to two data lines, during 2D display, in a display time of one frame, a gate line corresponding to each row of sub-pixels is configured to apply gate scanning signals to this row of sub-pixels, one of the two data lines corresponding to each column of sub-pixels is configured to apply gray scale signals to sub-pixels corresponding to the data line in the column of sub-pixels, and the other data line is configured to apply gray scale signals to sub-pixels corresponding to the other data line in the column of sub-pixels;
in a case where each column of sub-pixels correspond to one gate line and each row of sub-pixels correspond to two data lines, during 2D display, in the display time of one frame, a gate line corresponding to each column of sub-pixels is configured to apply gate scanning signals to this column of sub-pixels, one of the two data lines corresponding to each row of sub-pixels is configured to apply gray scale signals to sub-pixels corresponding to the data line in the row of sub-pixels, and the other data line is configured to apply gray scale signals to sub-pixels corresponding to the other data line in the row of sub-pixels.

3. The array substrate of claim 1, wherein each of the pixels comprises a red sub-pixel, a green sub-pixel, a blue sub-pixel and a white sub-pixel; or each of the pixels comprises a red sub-pixel, a green sub-pixel, a blue sub-pixel and a yellow sub-pixel.

4. A 2D/3D switchable display panel comprising the array substrate of claim 1.

5. A 2D/3D switchable display device comprising: the 2D/3D switchable display panel of claim 4.

6. The 2D/3D switchable display panel of claim 4, comprising:

in a case where each row of sub-pixels corresponds to one gate line and each column of sub-pixels correspond to two data lines, during 3D display, in a display time of one frame, two adjacent gate lines corresponding to each row of pixels applying gate scanning signals to this row of pixels, and two data lines corresponding to each column of sub-pixels applying gray scale signals to two sub-pixels belonging to each pixel in this column of sub-pixels respectively; or in a case where each column of sub-pixels correspond to one gate line and each row of sub-pixels correspond to two data lines, during 3D display, in a display time of one frame, two adjacent gate lines corresponding to each column of pixels applying gate scanning signals to this column of pixels, and two data lines corresponding to each row of sub-pixels applying gray scale signals to two sub-pixels belonging to each pixel in this row of sub-pixels respectively;

wherein each pixel has a same arrangement for its four sub-pixels having color filters of different colors;

in a case where each row of sub-pixels corresponds to one gate line and each column of sub-pixels correspond to two data lines, one of the two data lines corresponding to each column of sub-pixels applies gray scale signals to each sub-pixel in odd numbered rows in the column of sub-pixels, the other data line applies gray scale signals to each sub-pixel in even numbered rows in the column of sub-pixels;

in a case where each column of sub-pixels correspond to one gate line and each row of sub-pixels correspond to two data lines, one of the two data lines corresponding to each row of sub-pixels applies gray scale signals to each sub-pixel in odd numbered columns in the row of sub-pixels, the other data line applies gray scale signals to each sub-pixel in even numbered columns in the row of sub-pixels.

7. The 2D/3D switchable display panel of claim 6, further comprising:

in a case where each row of sub-pixels corresponds to one gate line and each column of sub-pixels correspond to two data lines, during 2D display, in a display time of one frame, a gate line corresponding to each row of sub-pixels applying gate scanning signals to this row of sub-pixels, one of the two data lines corresponding to each column of sub-pixels applying gray scale signals to sub-pixels corresponding to the data line in the column of sub-pixels, and the other data line applying gray scale signals to sub-pixels corresponding to the other data line in the column of sub-pixels;

in a case where each column of sub-pixels correspond to one gate line and each row of sub-pixels correspond to two data lines, during 2D display, in the display time of one frame, a gate line corresponding to each column of sub-pixels applying gate scanning signals to this column of sub-pixels, one of the two data lines corresponding to each row of sub-pixels applying gray scale signals to sub-pixels corresponding to the data line in the row of sub-pixels, and the other data line applying gray scale signals to sub-pixels corresponding to the other data line in the row of sub-pixels.

* * * * *